Figure 1A:
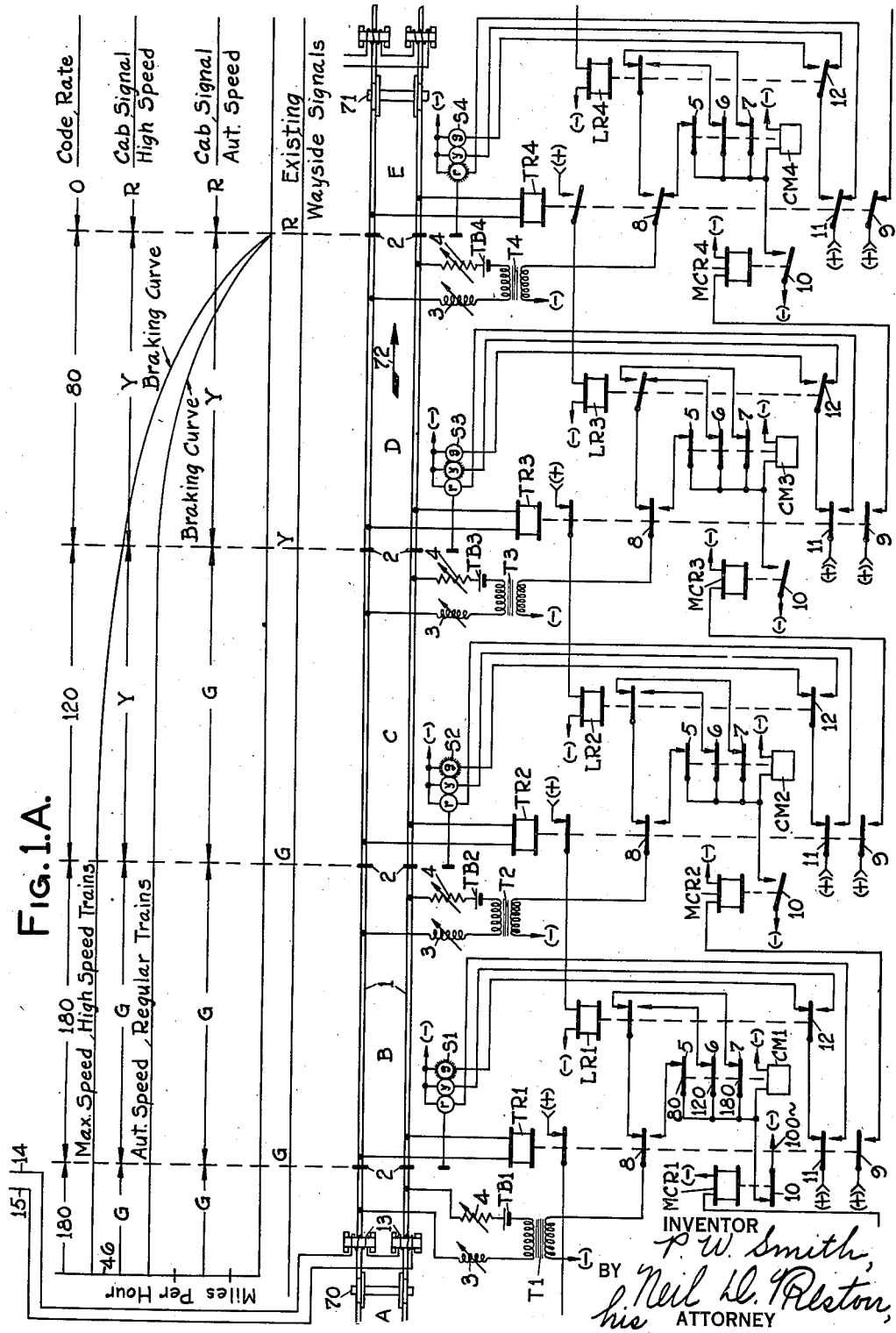

Sept. 9, 1941. P. W. SMITH 2,255,192
CODED CONTINUOUS TRAIN CONTROL AND CAB SIGNALING SYSTEM FOR RAILROADS
Filed June 17, 1939 3 Sheets-Sheet 1

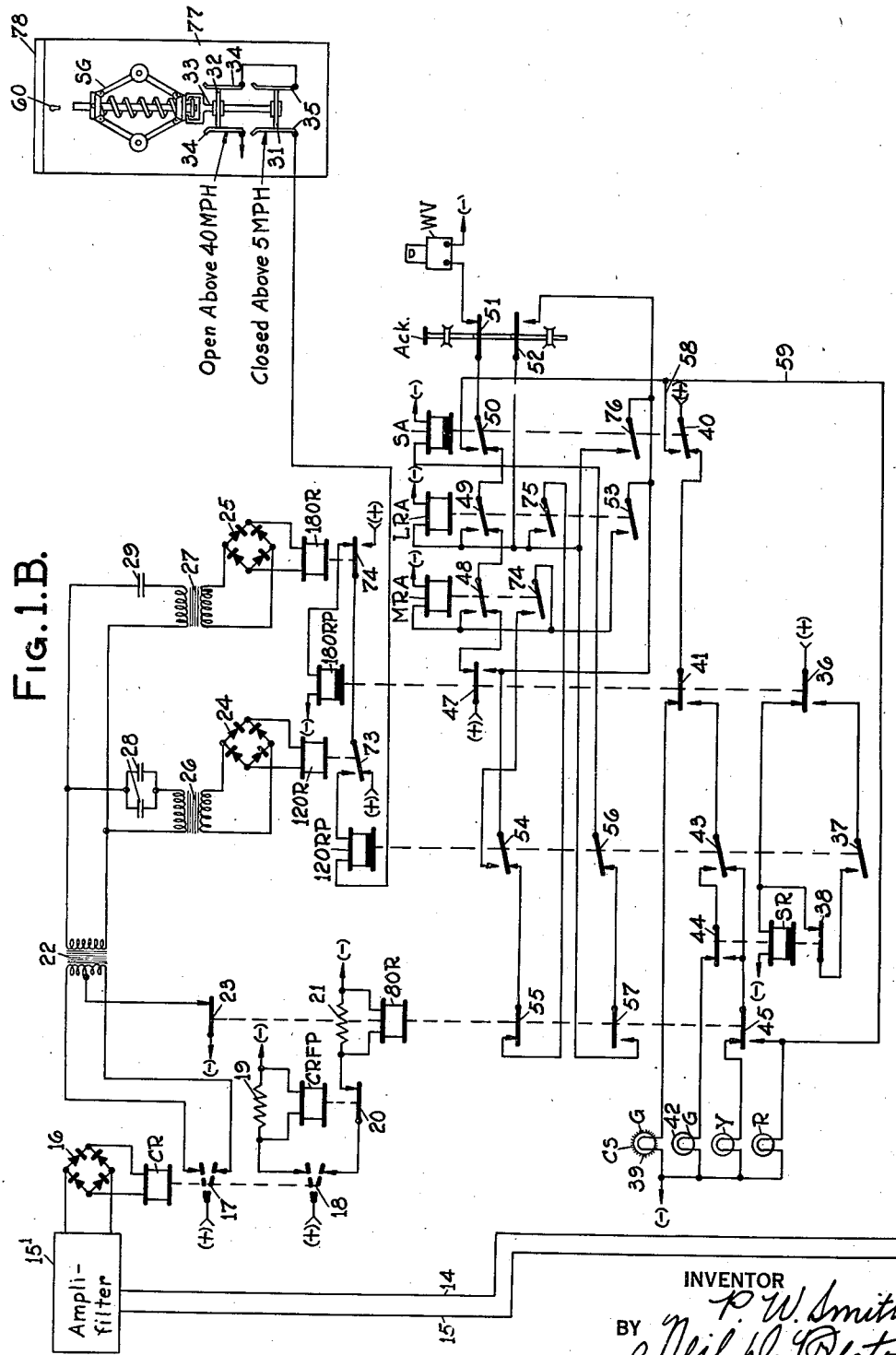

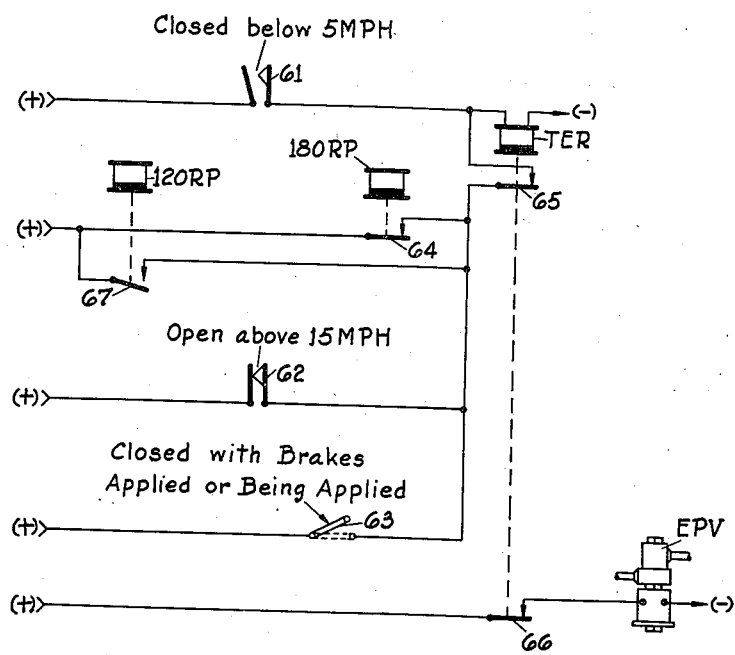

Patented Sept. 9, 1941

2,255,192

UNITED STATES PATENT OFFICE 2,255,192

CODED CONTINUOUS TRAIN CONTROL AND CAB SIGNALING SYSTEM FOR RAILROADS

Percy W. Smith, New York, N. Y., assignor to General Railway Signal Company, Rochester, N. Y.

Application June 17, 1939, Serial No. 279,663

21 Claims. (Cl. 246—63)

This invention relates, in general, to train control systems, and has more particular reference to a coded continuous train control system employing cab signals which are conditioned in accordance with train speed.

One of the objects of the present invention is to provide car carried apparatus conditioned in accordance with train speed to thereby variously control cab signals. More specifically, if, with existing wayside signals, the spacing of the signals is not adequate for providing sufficient braking distance for high speed or heavy trains, the present invention provides cab signals which will respond, in accordance with speed, to provide safe braking distance, whereby to make it unnecessary to change the wayside signal locations.

A further object of the present invention is to provide means for enforcing vigilance on the part of the engineer and for insuring that he take advantage of the braking distance provided, and promptly apply the brakes under various limiting conditions or be subjected to a penalty upon failure to do so.

Further objects, purposes and characteristic features of the present invention will appear as the description progresses, reference being made to the drawings, showing, in a wholly diagrammatic manner, and in no way, in a limiting sense, two forms which the invention can assume. In the drawings—

Fig. 1, constituted by partial Figs. 1A and 1B, assembled in an obvious manner, is a diagrammatic showing of trackway and car carried apparatus in accordance with the present invention.

Fig. 2 is a modified form of the invention comprising an extension of the invention illustrated in Fig. 1.

Referring now to the drawings, and first to Fig. 1, there is here shown a stretch of track constituted by track rails 1, separated in a usual manner, by insulating joints 2, into isolated track sections A, B, C, D and E. Each track section has a track relay TR, connected across its entrance end while across its exit end is a track battery TB, in series with the secondary of a track transformer T, and with a variable inductance 3, and a variable resistance 4, whereby to permit applying coded alternating current across the exit end of the block, as will appear below.

The various apparatus at each signal location is the same at each signal location, and accordingly, each identical element is identified by the same reference character, with a distinctive suffix number.

At each signal location is a wayside signal S, shown in this particular case as a light signal, having three aspects, green, yellow and red, designated by $g$, $y$, and $r$ respectively.

For applying coded alternating current of a non-commercial frequency, as 100 cycles per second, to the track rails, there is employed a code motor CM, controlled by a motor control relay MCR, the motor, when operating, vibrates code fingers 5, 6 and 7 at various rates; in the particular case illustrated, respectively, at the rate of 80, 120 and 180 times per minute. In this manner, alternating current is supplied to the track rails in spaced impulses at the rates designated. In this connection, the code applying apparatus is similar to that of Reissue Patent 19,599, granted June 4, 1935, to W. D. Hailes, and reference to this patent can be had for further details.

For controlling the code application and the wayside signals, there is also employed a usual line relay LR.

Designated by the wheels and axle 70 is a car or train occupying block A, while the wheels and axle 71 designates a car or train occupying block E, traffic being assumed to pass in the direction of the arrow 72, that is, easterly, or from left to right.

Considering the signal location of signal 53, it can be seen that, with block E occupied, track relay TR4 is released, whereby to connect the primary of track transformer T4, to the 80 rate code finger, through contact finger 8 and back point of track relay TR4. Upon a train entering block D, track relay TR3 releases, to close contact finger 9 on its back point and energize motor control relay MCR4, through an obvious circuit, whereby to pick up contact finger 10, and energize code motor CM4, through an obvious circuit, whereby to apply code at the rate of 80 impulses per minute to the exit end of block D.

In a similar manner, in connection with the code applied to the exit end of block C, upon a train entering this block, it can be seen with track relay TR3 picked up and line relay LR3 released, code at the rate of 120 impulses per minute is applied.

To the exit ends of blocks B and A, code is applied at the rate of 180 impulses per minute, since in the case of each of these blocks the controlling track relay and line relay are both up. Each line relay, as LR3, repeats the track relay, as TR4, next in advance.

Returning again to signal location S3, it can be seen with track relay TR3 up and line relay LR3 down, that the signal is displaying a yellow light, the circuit passing through contact finger 11 and front point of the track relay, and contact 12 and back point of the line relay.

In a similar manner, signal S4 is displaying a red light, while signals S2 and S1 are displaying green lights.

With the track apparatus as described above, it can be seen that at the entrance end of an occupied block, the wayside signal displays a red or danger indication at the entrance end of the block immediately to the rear thereof, a yellow or caution indication is displayed, and at the entrance ends of all vacant blocks to the rear thereof, a green or proceed indication is displayed.

With regard to the codes applied to the track rails of the various blocks, with a train occupying a block, the wheels and axles of the train by-pass the code energy applied to the exit end of such block, whereby in this block, to the rear of the occupying train, no code energy is present on the track rails.

With approach control, as described above, no code is applied to the exit end of a block, until that block is entered. Upon entering the block immediately to the rear of an occupied block, such as block D, the most restrictive, or 80 rate code, is applied; in block C a lesser restrictive or 120 rate code, is applied, while in block B, and other blocks to the rear thereof, the last restrictive, or 180 rate code is applied.

Referring now to the car carried apparatus, and considering for the moment car 70, this car is supplied, in a usual manner with receiver cores and coils 13, carried in inductive relation to the track rails and ahead of the foremost car axle. The receiving coils are connected, through wires 14 and 15, to an amplifilter 15¹, which amplifies the received energy, and is tuned to pass only 100 cycle current in sufficient volume to influence the car carried receiving apparatus. The ampli-filter can be of any usual or desired form, but is preferably of the vacuum tube type, and may comprise several stages of amplification, and may be of the type disclosed in the patent to O. H. Dicke, 1,942,138, granted January 2, 1934.

The output side of the ampli-filter 15¹ is connected to the input side of a full-wave rectifier 16 which may be of the dry-plate copper-oxide type, or any other suitable type, the output side of which is connected to a code relay CR, which is arranged to pick up for each current impulse, and to release for each current-off space between impulses. In this manner, the contact fingers 17 and 18 of relay CR pick up and release for each impulse, whereby to vibrate at the rate of the code being received.

A code relay front repeater relay CRFP is employed and is made slow releasing by means of a resistance 19, connected across its windings. This relay picks up through contact finger 18 and front point of relay CR, and is slow enough to release to hold up during the current-off periods.

Relay 80R is an 80 rate relay, and is picked up through contact finger 18 and back point of relay CR and contact finger 20 and front point of relay CRFP. This relay also is made slow to release, by means of a shunting resistance 21, whereby to hold up during current-on periods. Thus, relay 80R picks up and stays up during the reception of any coded energy, but to so stay up, it is necessary that relay CR follow the code, since if CR should stick up, 80R would be de-energized, and if CR should fail to pick up, relay 80R would also be deenergized, due to the opening of contact finger 20 and front point of relay CRFP.

Transformer 22 is provided, and has its primary winding connected at an intermediate point through contact finger 23 and front point of relay 80R, to one side of a source of direct current, the other side of this source being connected to the heel of contact finger 17, of relay CR. Contact finger 17 has a front point connected to one end of the primary of transformer 22 and a back point connected to the other end of this primary, whereby to constitute a "push-pull" type of transformer control. This arrangement is similar to that disclosed in the Hailes Reissue Patent 19,599, referred to above. It is obvious that with relay CR vibrating its contact finger 17, first one part, and then the other part of the primary of transformer 22 is energized, respectively first in one direction and then in the other to thereby produce impulses in the secondary of the transformer occurring at the same rate as the code being received.

The secondary of transformer 22 has connected thereto in multiple two rate relays 120R and 180R through full-wave rectifiers 24 and 25, respectively, and transformers 26 and 27 respectively, the primaries of which transformers are respectively connected in series with tuning condensers 28 and 29. This results in tuning the energizing circuit for relay 120R, to readily pass current pulses only at 120 times per minute, and to tune the energizing circuit for relay 180R, to readily pass only current pulsed at 180 times per minute.

With the arrangement above described, rate relay 80R picks up and stays up while coded energy at any of the various rates is being received, while rate relay 180R picks up only upon receipt of code at the rate of 180 impulses per minute, and code relay 120R picks up only on receipt of code at the rate of 120 impulses per minute.

Slow releasing repeater relays 120RP and 180RP are employed, the repeater 180RP having an energizing circuit passing through contact finger 73 and back point of relay 120R, and contact finger 74 and front point of relay 180R.

In connection with the energizing circuit for the repeater relay 120RP, there are employed speed controlled contacts 31 and 32, fastened to a shaft 33, which is a part of a speed controlled fly-ball governor of any usual design such for example as disclosed in the Preston Patent Ser. No. 1,744,012 granted January 4, 1930. The contacts 31 and 32, which move with the shaft 33 in an upward direction as the speed increases, coact with fixed contacts 34 and 35 respectively, contact 31 closing on its fixed contacts 35 at a low speed, such as any speed above 5 miles per hour, and is a check means to insure the governor is operative, or relay 120RP cannot get energy. Contact 32 opens its fixed contacts 34, at any speed above an authorized speed which may, for example, be 40 miles per hour.

The energizing circuit for repeater relay 120RP passes through contact finger 74 and back point of relay 180R, contact finger 73 and front point of 120R, speed controlled check contacts 31 and 35—35, and speed controlled contacts 32 and 34—34. Thus, it is seen that if the authorized speed, such as 40 miles per hour be exceeded, the repeater relay 120RP cannot pick up even though its rate relay 120R is picked up.

Carried, preferably in the cab of the locomotive is a visual cab signal CS capable of displaying four aspects G, G, Y and R, the two G aspects sifnifying proceed, the Y caution, and the R caution prepared to stop. This cab signal is controlled by the relays 80R, 120RP and 180RP, and a relay SA which is a slow releasing relay, and also by a stick relay SR, which is made slow to release, and has a pick-up circuit including contact finger 36 and front point of relay 180RP, and a stick circuit including contact finger 36 and back point of relay 180RP, contact finger 37 and front point of relay 120RP, and its own contact finger 38 and front point. The function of this latter relay will appear as the description progresses.

With 180 rate code being received, relay 180RP is picked up and also of course 80R, and the cab signal displays the upper green light G or proceed indication, due to the closure of an energizing circuit for this signal light 39, which includes contact finger 40 and back point of relay SA, and contact finger 41 and front point of relay 180RP.

Upon code at the rate of 120 per minute being received, if the speed is within the authorized speed, relay 120RP picks up and shortly thereafter 180RP releases. Stick relay SR, which had its pick-up circuit closed while relay 180RP is now up, due to its stick circuit, traced above, being closed. Accordingly, the cab signal CS displays the lower green or proceed indication, dut to the energization of lamp 42 through an energizing circuit including contact finger 40 and back point, contact finger 41 and back point contact finger 43 and front point of relay 120RP, and contact finger 44 and front point of stick relay SR.

Had the speed been above the authorized speed, so as to open the energizing circuit for relay 120RP at the speed controlled contact 32, even though code at the rate of 120 were being received, relay 120RP would not have been picked up, and instead of receiving a proceed indication, energy would have passed through contact finger 43 and back point of relay 120RP, and contact finger 45 and front point of relay 80R to give the more restrictive or caution indication Y or yellow.

Upon the code changing to the 80 rate, relay 120RP if already up, will release and the circuit just traced for the yellow lamp Y is completed, to thereby give a caution indication.

Upon the 80 rate code ceasing, relay 80R will release, whereby to give the most restrictive or red indication R, through an energizing circuit including contact finger 40 and back point, contact finger 41 and back point, contact finger 43 and back point, and contact finger 45 and back point.

The various codes, occurring in a sequence as set forth above, would be received by the rear vehicle 70, if it should proceed easterly while vehicle 71 remains stationary.

The stick relay SR is provided to insure that, upon a caution, or yellow indication being once received, it cannot be replaced by a less restrictive, or proceed indication G, unless the 180 rate code be received, regardless of variations of speed of the vehicle meantime.

For example, if, on receiving the 120 rate code, the speed be within the authorized speed, and the next prior code had been the 180 rate code, relay 120RP will pick up to energize the green light 42, and stick relay SR will be picked up. If, while proceeding under this indication the speed should exceed the authorized speed, relay 120RP will become deenergized and release and the indication will change to the caution or yellow Y. The release of relay 120RP breaks the stick circuit for relay SR which releases its contact finger 44. Should the train speed now be reduced, while operating under this caution indication, to be within the authorized speed, relay 120RP will pick up, but stick relay SR will remain down, and the indication will remain at caution or Y. It is only upon the receipt of 180 rate code that the indication can be changed to the least restrictive or proceed G.

In effect, the stick relay SR operates after relay 120RP has once released, to stick 120RP down insofar as its influence on the cab signals is concerned, until after the least restrictive or 180 rate code has been received.

Upon the codes changing from most restrictive to least restrictive, that is, in the order 0 80, 120 and 180, upon receiving the 120 rate code, and assuming the speed is within the authorized speed, relay 120RP will pick up, but since stick relay SR is released, the caution or Y indication is received, instead of the proceed or G indication. Thus, regardless of speed variations and regardless of whether the codes are changing to more restrictive or to lesser restrictive, relay SR operates, after a caution or Y indication has been received, to prevent the receipt of a proceed indication, as G, except upon receipt of the 180 rate code.

The operation of the system is indicated diagrammatically in the speed and braking curves shown above the stretch of track. The car speed is indicated in a vertical direction, along the axis 46, the line "Aut. speed regular train" indicates a train speed within the authorized speed of, for example, 40 miles per hour; and the part labeled "Braking curve" above block D and connected to this speed line diagrammatically indicates the train speed under service braking conditions. Thus, it can be seen, the train operating within the authorized speed receives a yellow or caution indication in time to bring the train to a full stop before it enters the occupied block.

The line labeled "Max. speed high speed trains" indicates speeds up to a maximum of, for example, 60 miles per hour, and the curve "Braking curve" connected thereto, indicates the speed under service braking conditions. Thus it can be seen that a high speed train operating at the maximum speed requires two blocks to the rear of an occupied block in order to be brought to a stop before entering the occupied block.

With the arrangement described above, it is seen that on reaching this second block C, to the rear of the occupied block E, the 120 rate code is always received, and with the speed above the authorized speed, this 120 rate results in giving a caution indication on the car, whereby to insure sufficient distance for braking at the high speeed, so as to bring the train to a full stop before entering the occupied block.

The speeds referred to above as maximum and authorized are wholly arbitrary designations, and can of course be varied at will, and the speed governor SG, which is controlled from the car axle, for example, can be set to open and close its contacts at any desired speeds, all in accordance with the governing speed and braking curves.

From the above explanation it can be seen that a train proceeding within authorized speed, receives a caution indication on entering the first block to the rear of an occupied block, while one proceeding at a speed above the authorized speed receives this caution indication on entering the second block to the rear of an occupied block, whereby to provide sufficient distance for safe braking operation at the respective speeds. It can also be seen that, due to the operation of stick relay SR, if the codes change from more to less restrictive, the train will receive a caution indication both when within one block of the occupied block and within two blocks of the occupied blocks, but since this apparently can occur only when the forward train is increasing the distance between it and the rear train, it does not appear of controlling importance.

In order to insure that the engineer be vigilant, and notice the changes in signal aspect in the cab from less to more restrictive, an acknowledging means is provided in the form of acknowledging contactor Ack. and a whistle valve WV which sounds when deenergized, and in addition to the slow rate acknowledging relay SA, which is slow to release, two additional acknowledging relays, a low rate acknowledging relay LRA, and a medium rate acknowledging relay MRA.

With the relays and parts in their positions as shown in the drawings, the whistle is silent, since it is energized through a circuit including contact finger 47 and front point of relay 180 RP, contact finger 48 and back point of relay MRA, contact finger 49 and back point of relay LRA, contact finger 50 and back point of relay SA, and acknowledging contact finger 51 and front point.

Upon a change in conditions to more restrictive, as for example, the code changing from 180 rate to 120 rate, whereby relay 180RP releases, and relay 120RP picks up, the energizing circuit for the whistle valve WV is broken at contact finger 47 and front point, and the whistle sounds until the acknowledging contactor is manually operated by depressing the same.

Upon operation of the acknowledging contactor, a circuit for energizing acknowledging relay LRA is completed, which includes contact finger 47 and back point, and the acknowledging contact finger 52 and back point; and upon relay LRA picking up, a circuit is completed for energizing acknowledging relay MRA, which includes contact finger 47 and back point, and contact finger 53 and front point of relay LRA.

Relay MRA, when picked up, sticks up through a circuit including contact finger 47 and back point, contact finger 54 and front point of relay 120RP, and contact finger 74 and front point of relay MRA, whereby to stay up until the code changes, since its stick circuit is dependent upon the rate relay repeater 120RP.

With acknowledging relay MRA picked up, an energizing circuit for silencing the whistle WV is completed, which includes contact finger 47 and back point, contact finger 54 and front point, contact finger 74 and front point, contact finger 48 and front point, etc.

Upon the code changing to the 80 rate, relay 120RP releases, to thereby de-energize the whistle WV and cause it to sound. Upon acknowledging, relay LRA picks up, as before, to thereby pick up relay MRA as before. In this case, relay LRA sticks up through a circuit including contact finger 47 and back point, contact finger 54 and back point, contact finger 55 and front point of relay 80R and contact finger 75 and front point of relay LRA; and with relay LRA stuck up, relay MRA also remains up, to thereby complete an energizing circuit for the whistle valve which includes contact finger 47 and back point, contact finger 54 and back point, contact finger 55 and front point, contact finger 75 and front point, contact finger 49 and front point, etc., and thereby silence the whistle.

Upon a change in code from the 80 rate to no code whatsoever, relay 80R releases to thereby deenergize the whistle valve, and cause it to sound and to require acknowledgment to silence it. Upon acknowledging, relay SA will pick up through a circuit including contact finger 56 and back point, contact finger 57 and back point, acknowledging contact finger 52 and back point, and contact finger 47 and back point. This relay, after picking up, sticks up through a circuit including contact finger 56 and back point, contact finger 57 and back point, its own contact finger 76 and front point, and contact finger 47 and back point. With relay SA stuck up, relays LRA and MRA pick up and remain up, as is obvious from the above.

With relay SA up, the whistle valve is energized through a circuit including contact finger 48 and front point, contact finger 50 and front point, etc., to thereby silence the whistle.

Upon the code changing to less restrictive, no acknowledgment is necessary, since, as seen just above, with no code the three code relays MRA, LRA and SA are all up, and as the code progresses towards less and less restrictive, these relays drop in order from SA toward MRA and the whistle valve does not sound even though momentarily deenergized, if it be made slow acting. If it be made quick acting, it will momentarily sound upon each change towards less restrictive.

For example, on a change in code from no code to the 80 code, relay 80R picks up, to thereby break the stick circuit for relay SA, which thereupon releases and during the time its contact finger 50 is moving from its front point to its back point, the whistle valve WV is deenergized. As soon as contact finger 50 makes up its back point the above traced circuit for energizing the whistle valve, which passes through contact finger 50 and back point, contact finger 49 and front point of relay LRA, etc., is closed.

Upon relay SA being picked up by acknowledgment, the most restrictive signal indication R, or red, is energized through an alternative circuit which includes contact finger 40 and front point, and wires 58, 59, etc.

If on change from 180 rate to 120 rate code, the speed be above the authorized, although 180RP releases, relay 120RP does not pick up. Thus the whistle valve is deenergized and upon acknowledgment, the acknowledging circuits are the same as described above for a change from 120 rate to 80 rate code; that is, the signal has changed from G to Y, the acknowledging relay LRA is stuck up, and the whistle valve is energized through relay LRA up, relay 80R up, and relays 120RP and 180RP down.

Upon such conditions, should the code change from 120 to 80, there would be no change in the signal controlling relays, and hence no change in the signal aspect which would remain at Y or caution. Also, there would be no change in the circuit involved in the acknowledging system, and accordingly, acknowledgment due to this last change is not required.

With regard to the acknowledging system employed, it is to be noted that acknowledgment is required upon every change in code toward a more restrictive code, whether there be a change in the cab signal aspect or not, and hence the system is on the side of safety.

For example, on changing from the 180 to the 120 code, the signal may or may not change from proceed to caution, depending upon the speed existing at that time, but regardless of whether or not there is a change in the signal, the release of the 180 rate repeater relay necessitates acknowledging in order to silence the whistle valve.

With regard to the speed governor, and the speeds at which it operates, it is of course understood that these speeds may differ from those specified above. Furthermore, in considering the braking of a train, the braking effect required depends upon the energy to be absolved, and this in turn depends upon the momentum, that is, it depends upon the first power of the mass, and the square of the velocity. Accordingly, one train which is slower than another, might be enough heavier to require a greater braking effect. Furthermore, the number of cars included in the train is a factor, since the number of brake shoes available vary with the number of cars. Accordingly, it appears that in general the braking effect will depend upon the speed of the train and upon the amount of mass involved per brake unit.

With the above in view, it may be desirable to encase the governor by a casing, such as 77, having a cover 78 which can be locked by a key or the like, through keyhole 69, so as to make the governor inaccessible to any one except an authorized person, as for example, the conductor. If desired, the conductor can be supplied with a key for gaining access to the governor and can ascertain the authorized speed for this particular train, and set the governor accordingly.

On the other hand, the governor can be positioned inaccessively to all of the train crew, or can be so constructed so as to be incapable of adjustment.

As described, the system provides adequate braking distance for trains of various mass and various speeds, but nothing is so far provided for enforcing the application of the brakes upon the warning signal being given, except the fear on the part of the engineer, that unless he immediately applies his brake, he may endanger his life.

If it be desired to more strictly enforce an obedience to the warning signal, provision can be made, as shown in Fig. 2 to accomplish this.

In Fig. 2 in a wholly diagrammatic manner, there is shown the repeater relays 120RP and 180RP, which operate as described above. Furthermore, there is shown a speed controlled contact 61, which can be operated by the governor SG, and which is closed at all speeds below 5 miles per hour. There is another speed controlled contact 62, which can be operated by the governor as is contact 61, and which is arranged to be closed at all speeds above 16 miles per hour.

The engine is contemplated as being equipped with the usual engineer's brake valve, for controlling the usual air brake system and a contact 61 is provided which is arranged to close its circuit when the brakes have been manually applied or are being manually applied. Controlled by these various contacts and relays is a slow releasing time element relay TER, which in the present instance is provided with a release time of approximately two seconds, and this relay is employed for controlling a usual electro-pneumatic valve EPV, which is normally energized and which upon deenergization produces an automatic emergency brake application.

A speed governor and an electro-pneumatic valve can be employed of the type as disclosed in the Preston Patent 1,744,012, cited above.

With the parts arranged as shown in Fig. 2, the 180 rate code is presumed to be present, whereby relay TER is held up through a stick circuit including contact finger 64 and front point of 180RP, and contact finger 65 and front point of the relay TER. With relay TER up, the valve EPV is energized through an obvious circuit, which includes contact finger 66 and front point of relay TER.

Upon the code changing to a more restrictive one, such as the 120 rate, relay 180RP will release to break the stick circuit traced above, and if the speed be within the authorized speed, relay 120RP will already have picked up to complete a shunt around contact finger 64 of relay 180RP, and maintain the stick circuit for relay TER completed, this shunt including contact finger 67 and front point of relay 120RP.

If, however, the speed be above the authorized speed, so that the 120 rate code does not pick up relay 120RP, or if the change in code be to a more restrictive one, such as the 80 rate code, whereby regardless of the speed relay 120RP does not pick up, then if the speed be above 15 miles per hour, speed contact 62 will be open and relay TER becomes a deenergized and an automatic emergency brake application is impending, unless something be done within the release time of relay TER.

In the present system, if the engineer immediately applies his brakes by moving the brake valve handle to service position, for example, contact 63 closes an obvious stick energizing circuit for relay TER and upon completing a full service brake application, or reducing the speed to 15 miles per hour, the brake valve handle can be returned to release, for example, without incurring the automatic brake application.

If at the time relays 120RP and 180RP are both released, the speed is not above 15 miles per hour, the suppressive brake referred to above need not be put into effect, in order to prevent an automatic emergency brake application.

After an automatic emergency brake application has been incurred, in order to proceed, it is necessary that the speed be reduced to below 5 miles per hour, to thereby close contact 61, to pick up relay TER, and hence re-energize the EPV.

The various speeds referred to above, in connection with Fig. 2 can of course be varied in accordance with surrounding conditions, since the values employed are given merely by way of example, although contact 61 should be closed only when the train is substantially at standstill, while contact 62 should open at a speed above a very moderate speed.

The above rather specific description of two forms which this invention can assume, has been given solely by way of example, and is not intended, in any sense whatsoever, in a limiting manner. It is obvious that various modifications, variations and adaptations, as may appear desirable from any point of view from time to time, can be effected, without departing from the scope and spirit of this invention, except insofar as the invention is limited by the appended claims.

Having described my invention, I now claim:

1. In a coded continuous train control system, in combination with means for placing control energy on the trackway coded at various rates in accordance with traffic conditions ahead, a car carried receiver positioned to receive the control energy, decoding means on the car responsive to energy in the receiver to impose any one of a plurality of restrictions on the car varying in degree each from the other in correspondence with the code rate in force while the car speed is within an authorized speed, and means cooperating with the decoding means when the car speed is above the authorized speed, to impose one of said plurality of restrictions of a degree, in response to a given code, that is higher than is imposed when the speed is within the authorized speed.

2. In a coded continuous train control system, in combination, wayside signals, means controlled by traffic conditions ahead to cause the signals to indicate restrictions of varying degrees, means for placing control energy on the trackway coded at various rates in accordance with traffic conditions ahead, a car carried receiver positioned to receive the control energy, a cab signal, decoding means on the car responsive to energy in the receiver to impose cab signal restrictions varying in degree in accordance with the code rate in force, and of the same degree as the corresponding wayside signal, when the car speed is within an authorized speed, means cooperating with the decoding means, when the car speed is above the authorized speed, to impose a restriction of higher degree in response to a given code than is imposed when the speed is within the authorized speed and also of a higher degree than that of the corresponding wayside signal, and means for automatically imposing a penalty unless the engineer performs a manual act upon the imposition of said restriction of higher degree.

3. In a coded continuous train control system, in combination with means for placing control energy on the trackway coded at various rates in accordance with traffic conditions ahead, a car carried receiver positioned to receive the control energy, decoding means on the car responsive to energy in the receiver to impose any one of a plurality of restrictions on the car varying in degree in accordance with the code rate in force when the car speed is within an authorized speed, means cooperating with the decoding means when the car speed is above the authorized speed, to impose one of said restrictions in response to a given code of a degree higher than that of said restriction imposed when the speed is within the authorized speed, and means for automatically imposing an emergency brake application, upon the imposition of said restriction of higher degree, unless a manual brake application be promptly put into force.

4. In a coded continuous train control system, in combination with means for placing control energy on the trackway coded at various rates in accordance with traffic conditions ahead, a car carried receiver positioned to receive the control energy, a plural aspect cab signal, decoding means on the car responsive to energy in the receiver to display a signal aspect varying in degree of restrictiveness in accordance with the code rate in force so long as the car speed is within an authorized speed, means cooperating with the decoding means when the car speed is above the authorized speed, to display a signal aspect of restriction of higher degree in response to a given code than is imposed when the speed is within the authorized speed, and means for automatically imposing an emergency brake application, upon the imposition of said aspect of restriction of higher degree, unless a manual brake application be promptly put into force, and provided the car speed at that time be above a predetermined low speed.

5. In a coded continuous train control system, in combination with means for placing control energy on the trackway coded at various rates in accordance with traffic conditions ahead, a car carried receiver positioned to receive the control energy, decoding means on the car responsive to energy in the receiver to impose any one of a plurality of restrictions on the car varying in degree in accordance with the code rate in force when the car speed is within an authorized speed, a speed governor cooperating with the decoding means and operative when the car speed is above the authorized speed, to impose one of said restrictions in response to a given code of a higher degree than is that imposed when the speed is within the authorized speed, and acknowledging means requiring the performance of a manual act upon each change to a restriction of higher degree, in order to avoid a penalty.

6. In a coded continuous train control system, in combination with means for placing control energy on the trackway coded at various rates in accordance with traffic conditions ahead, a car carried receiver positioned to receive the control energy, decoding means on the car responsive to energy in the receiver to impose any one of a plurality of restrictions on the car varying in degree in accordance with the code rate in force so long as the car speed is within an authorized speed, a speed controlled device operative when the car speed is above the authorized speed to cause the decoding means to impose one of said restrictions in response to a given code of a higher degree than the degree of that imposed when the speed is within the authorized speed, and check means preventing a reduction of speed during operation under said given code, from changing the restriction of one of a lower degree.

7. In a coded continuous train control system, in combination with means for placing control energy on the trackway coded at high, medium and low rates, in accordance with traffic conditions ahead, a car carried receiver positioned to receive the control energy, decoding means on the car responsive to energy in the receiver to impose a low, low, and high restriction on the car, respectively, as the receiver energy is coded at the high, medium, and low rates, provided the car speed be within a predetermined authorized speed, and means responsive to speed, to cause the decoding means to produce the high restriction in response to the medium rate code, if the car speed be above the authorized speed.

8. In a coded continuous train control system, in combination with means for placing control energy on the trackway coded at high, medium and low rates, in accordance with traffic conditions ahead, a car carried receiver positioned to receive the control energy, decoding means on the car responsive to energy in the receiver to impose a low, low, and high restriction on the car, respectively, as the receiver energy is coded at the high, medium, and low rates, provided the car speed be within a predetermined authorized speed, means, responsive to speed, to cause the decoding means to produce the high restriction in response to the medium rate code, if the car speed be above the authorized speed, and means preventing said high restriction, once imposed, from being removed by change in speed.

9. In a coded continuous train control system, in combination with means for placing control energy on the trackway coded at high, medium and low rates, in accordance with traffic conditions ahead, a car carried receiver positioned to receive the control energy, decoding means on the car responsive to energy in the receiver to impose a low, low, and high restriction on the car, respectively, as the receiver energy is coded at the high, medium, and low rates, provided the car speed be within a predetermined authorized speed, means, responsive to speed, to cause the decoding means to produce the high restriction in response to the medium rate code, if the car speed be above the authorized speed, and means preventing the high restriction, once imposed, from being removed, so long as any code is present, except by the high rate code.

10. In a coded continuous train control system, in combination with means for placing control energy on the trackway coded at high, medium and low rates, in accordance with traffic conditions ahead, a car carried receiver positioned to receive the control energy, decoding means on the car responsive to energy in the receiver to impose a low, low, and high restriction on the car, respectively, as the receiver energy is coded at the high, medium, and low rates, provided the car speed be within a predetermined authorized speed, means responsive to speed, to cause the decoding means to produce the high restriction in response to the medium rate code, if the car speed be above the authorized speed, and penalty means, incurred shortly after the imposition of the restriction of high degree, unless a manual act be promptly performed.

11. In a coded continuous train control system, in combination with means for placing control energy on the trackway coded at high, medium and low rates, in accordance with traffic conditions ahead, a car carried receiver positioned to receive the control energy, decoding means on the car responsive to energy in the receiver to impose a low, low, and high restriction on the car, respectively, as the receiver energy is coded at the high, medium, and low rates, provided the car speed be within a predetermined authorized speed, means responsive to speed, to cause the decoding means to produce the high restriction in response to the medium rate code, if the car speed be above the authorized speed, means preventing the high restriction, once imposed, from being removed, so long as any code is present, except by the high rate code, and penalty means, incurred shortly after the imposition of the restriction of high degree, unless a manual act be promptly performed.

12. In a coded continuous train control system, in combination with means for placing control energy on the trackway coded at high, medium and low rates, in accordance with traffic conditions ahead, a car carried receiver positioned to receive the control energy, decoding means on the car responsive to energy in the receiver to impose a low, low, and high restriction on the car, respectively, as the receiver energy is coded at the high, medium, and low rates, provided the car speed be within a predetermined authorized speed, means responsive to speed, to cause the decoding means to produce the high restriction in response to the medium rate code, if the car speed be above the authorized speed, and means for producing an automatic emergency brake application, shortly after the imposition of the restriction of high degree, unless a manual service brake application be promptly put into force.

13. In a coded continuous train control system, in combination with means for placing control energy on the trackway coded at various rates in accordance with traffic conditions ahead, a car carried receiver positioned to receive the control energy, decoding means on the car responsive to energy in the receiver to impose restrictions on the car varying in degree in accordance with the code rate in force when the car speed is within an authorized speed, speed responsive means operative when the car speed is above the authorized speed to cause the decoding means to impose a restriction of higher degree in response to a given code than is imposed when the speed is within the authorized speed, and means for preventing unauthorized changing of said authorized speed.

14. In a coded continuous train control system, in combination, wayside signals, means controlled by traffic conditions ahead to cause the signals to indicate restrictions of varying degrees, means for placing control energy on the trackway coded at various rates in accordance with traffic conditions ahead, a car carried receiver positioned to receive the control energy, a cab signal, decoding means on the car responsive to energy in the receiver to impose cab signal restrictions varying in degree in accordance with the code rate in force, and of the same degree as the corresponding wayside signal, when the car speed is within an authorized speed, and means cooperating with the decoding means, when the car speed is above the authorized speed, to impose a restriction of higher degree in response to a given code than is imposed when the speed is within the authorized speed and also of a higher degree than that of the corresponding wayside signal.

15. In a coded continuous train control system, in combination, means for placing control energy on the trackway, coded at various rates in accordance with traffic conditions ahead, a car carried cab signal, decoding means on the car responsive to energy in the receiver to control the cab signal to give a restrictive indication in response to code of one rate when the car speed is within a limited speed, and other means associated with the decoding means and operative to give the same restrictive indication in response to code of a rate different than said one rate, when the car speed is higher than said limited speed.

16. In a coded continuous train control system, in combination, means to place coded energy on the trackway in accordance with traffic conditions ahead, a car carried cab signal, decoding means, and a speed responsive device associated with the decoding means for controlling the signal in accordance with the coded energy and the car speed, to give the same signal restriction under conditions of relatively high speed and relatively long distance behind a forward occupying car, and relatively low speed and relatively short distance behind the forward occupying car.

17. In a coded train control system, in combination, means for placing control energy on the trackway coded in accordance with traffic in advance to constitute a high proceed code, a low proceed code, and a caution code, a car carried receiver positioned to receive the control energy, control means on the car responsive to energy in the receiver to impose the same proceed signal indication in response to each of the proceed codes, a caution signal indication in response to the caution code, and car carried speed responsive means cooperating with the control means, and effective upon the car speed exceeding an authorized speed to cause the low proceed code to impose the said caution signal indication.

18. In a coded train control system, in combination, means for placing control energy on the trackway coded in accordance with traffic in advance to constitute a high proceed code, a low proceed code, and a caution code, a car carried receiver positioned to receive the control energy, control means including decoding means on the car responsive to energy in the receiver to impose a proceed restriction on the car which is the same, in response to either of the proceed codes, and a caution restriction in response to the caution code, car carried speed responsive means cooperating with the control means, and effective upon the car speed exceeding an authorized speed, and to cause the low proceed code to impose the said caution restriction, and check means to prevent the caution restriction when once imposed by the low proceed code from being changed to the proceed restriction by the car speed being reduced to within the authorized speed.

19. In a coded train control system, in combination, means for placing control energy on the trackway coded in accordance with traffic in advance to constitute a high proceed code, a low proceed code, and a caution code, a car carried receiver positioned to receive the control energy, control means including decoding means on the car and responsive to energy in the receiver to impose a proceed restriction which is the same, in response to either of the proceed codes, and a caution restriction in response to the caution code, car carried speed responsive means cooperating with the control means, and effective upon the car speed exceeding an authorized speed, to cause the low proceed code to impose the said caution restriction, and check means to prevent the caution restriction when once imposed by the low proceed code from being changed to the proceed restriction by the car speed being reduced to within the authorized speed, said check means including a stick relay having a pick-up circuit closed only when the high proceed code is being received, and a stick circuit closed only when the low proceed code is being received and the speed is within the authorized speed.

20. In a signal system for railways, in combination, a plural aspect signal, for displaying a proceed, a caution, and a stop, indication, automatic means responsive to traffic conditions ahead for controlling the signal to display its proceed indication under one traffic condition, its caution indication under a second and more dangerous traffic condition, and its stop indication under a third and more dangerous traffic condition, and means, cooperating with the automatic means, for causing the signal to display its caution indication under said one traffic condition if the speed of the train governed by the signal is above a predetermined value.

21. In a signal system for railways, in combination, a plural aspect signal, for displaying a proceed, a caution, and a stop, indication, automatic means responsive to traffic conditions ahead for controlling the signal to display its proceed indication under one traffic condition of occupancy a given control zone ahead, and to display its caution indication under a second traffic condition of occupancy a greater control zone ahead, provided the speed of a train governed by the signal is within an authorized speed; and speed responsive means associated with the automatic means, and, operative when the car speed exceeds the authorized speed, to cause the signal to display its caution indication under said one traffic condition.

PERCY W. SMITH.